United States Patent [19]

Hulse

[11] 4,290,509
[45] Sep. 22, 1981

[54] ANTI-LOCK SYSTEM

[75] Inventor: David O. Hulse, Lionville, Pa.

[73] Assignee: The Budd Company, Troy, Mich.

[21] Appl. No.: 73,010

[22] Filed: Sep. 6, 1979

[51] Int. Cl.³ ............................................. B60T 8/093
[52] U.S. Cl. .................................. 188/181 A; 303/113
[58] Field of Search ...................... 188/181 A, 181 R; 303/113, 115, 119

[56] References Cited

U.S. PATENT DOCUMENTS 2,964,048 12/1960 Mortimer .................. 188/181 A X
3,908,805 10/1975 Morse et al. .................... 188/181 A Primary Examiner—Duane A. Reger
Attorney, Agent, or Firm—A. L. Trueax, Jr.

[57] ABSTRACT

A wheel anti-lock system includes switching means located outside of a vehicle wheel with means passing from the switching means through or across the wheel to a source of control pressure inboard of the wheel which controls the application of service pressure to the brake of the wheel.

8 Claims, 5 Drawing Figures

ANTI-LOCK SYSTEM

BACKGROUND OF INVENTION

Brake control devices for preventing locking or sliding of vehicle wheels when the brakes are applied by an operator are well known. Such devices have included means for automatically controlling the release and reapplication of the wheel brake. Such "anti-lock" devices have been used in automotive vehicles such as trucks, truck trailers and buses, as well as in railway cars.

Brake control anti-lock devices have included, for example, rotary inertia type devices sensitive to acceleration and deceleration of a vehicle wheel, which may be installed within the hubs of existing truck-trailer wheels.

Anti-lock devices and systems have been described in a copending patent application, assigned to the same assignee as the present invention, of Mekosh and Hulse entitled "ANTI-LOCK MECHANISM", Ser. No. 026,795 filed Apr. 3, 1979.

A particular type of switching device includes an inertia wheel to open and close valves is described in the aforementioned patent application. Therein, the inertia wheel controls the application of service pressure to the brake to prevent wheel lock-up and may be of the same general type as that used and to be described in connection with the present invention.

In the anti-lock device disclosed in the aforementioned application, the inertia wheel is a switching unit and is connected to rotate with the vehicle wheel about its axis. The switching unit was connected through the wheel to a source of control pressure also located in the axis of rotation of the wheel. This was possible because a hollow tubular structure was located at the axis of the wheel and also inboard of the wheel to receive the connections from the switching unit. This arrangment, however, poses a problem when the means for controlling the control pressure cannot be located at the axis of rotation of the wheel as, for example, when solid drive axles are used as in a tractor or other such similar type vehicles.

It is an object of this invention to provide an improved pneumatic anti-lock system for a vehicle wheel rotatable on a solid or drive axle.

It is a further object of this invention to provide an improved pneumatic anti-lock system for a wheel of a tractor or other such similar vehicle.

It is still a further object of this invention to provide an improved anti-lock system with a switch axially connected outboard to rotate with a vehicle wheel to control pressure located inboard of the wheel by means of a pressure path from outboard to inboard and which is offset from the wheel axis.

SUMMARY OF INVENTION

In accordance with the present invention, a source of control pressure, hereinafter called pilot pressure, is located inboard of a vehicle wheel for permitting or preventing service pressure from being applied to the brake when the wheel is decelerated beyond a predetermined limit. Switching means is attached for axial rotation with the wheel outboard of the wheel and is connected to the source of pilot pressure located inboard and offset from the axis of the wheel. The switching means remains closed during normal rotation of the wheel to maintain the pilot pressure and to permit service pressure to be applied to the brake and opens when the wheel is decelerated beyond a predetermined rate to relieve the pilot pressure to prevent service pressure from being applied to the brake.

Other objects and advantages of the present invention will be apparent and suggest themselves to those skilled in the art, from a reading of the following specification and claims, taken in conjunction with the accompanying drawing, in which:

DESCRIPTION OF INVENTION

To provide a better understanding of the present invention, the components found in many conventional tractor trailer systems will be described generally.

As is known, service and supply pressure tank systems are included in most tractor-trailers. The supply tank system in a trailer is charged by air pressure from the tractor through the supply line. When the air pressure from the tractor reaches a valve, generally referred to as a ratio relay valve, it charges the supply tank, various hoses and the mechanical spring brakes. It also charges the service tank.

When the pressure in the supply tank reaches a predetermined level, such as 25 psi for example, the spring brakes begin to retract and a shuttle valve in the ratio relay valve permits the air pressure to charge the service tank. Generally, the spring brakes are completely released at a higher pressure, for example 60 psi.

Application of the parking brake or loss in the supply line pressure will generally cause the pressure of the ratio relay valve to be relieved, and the air pressure is exhausted from the emergency brake hoses and spring brakes. When the pressure falls below 25 psi the mechanical spring brakes automatically apply.

When the spring brakes are released and service brakes are applied by an operator in the tractor, air pressure will flow from a source within the tractor through the service line into the service brake system of the trailer.

The service pressure is applied to a relay valve which permits the air pressure in the service tank to be applied to the service brakes.

Release of the service brakes from the tractor cab causes the air pressure in the service line to be exhausted causing the relay valve to release the delivery air pressure from the service sides of the brake chambers thus releasing the service brakes.

Figure 1:
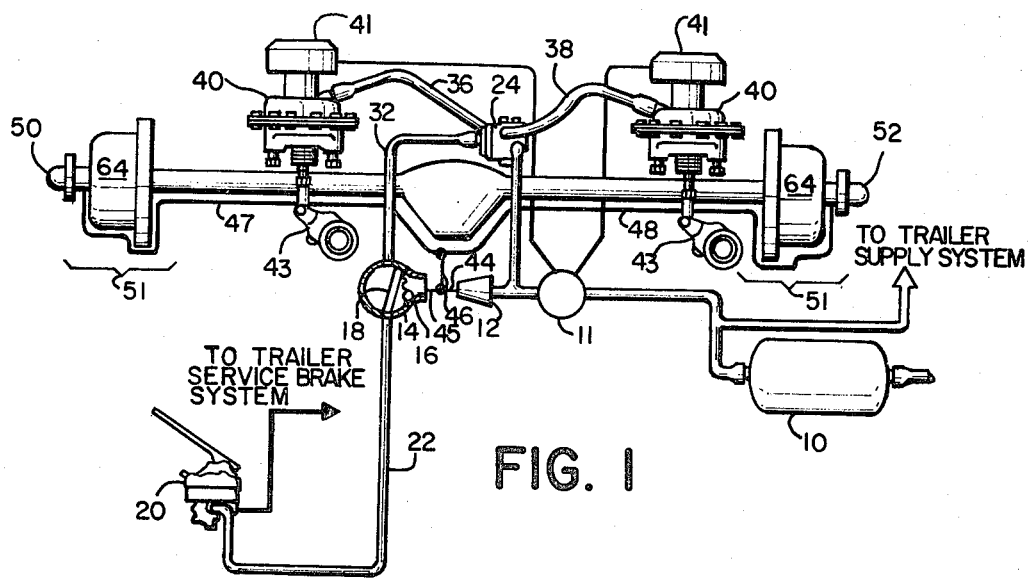
FIG. 1 represents a typical single drive axle tractor air brake system in which the present invention may be incorporated.

FIG. 1 illustrates a partial air brake system to which the present anti-lock invention is incorporated, portions of which were described in detail in the aforementioned application. Air pressure from a supply tank 10, originating at a trailer supply system, is applied through a parking brake valve 11, then through a pressure limiting control valve 12 to a slave valve 14 to force valve components 16 and 18 from the closed position illustrated to the open position where component 18 is aligned with lines 22 and 32 to permit pressure to be applied from line 22 to line 32. Service pressure resulting from operation of a brake valve 20 by the operator of a vehicle passes from the line 22 through the slave valve 14 through line 32 to a relay valve 24.

Pressure from the line 32 passes through a passageway in the valve 24 into a chamber within valve 24. The pressure in the chamber opposes the force of a spring and causes a piston therein to move and unblock in valve 24 ports connected to pressure lines 36 and 38. The distance moved by the piston is proportional to the service pressure at the line 32. Braking pressure is thus applied to brakes 40, which include adjusters 31, from the supply tank 10 through the pressure lines 36 and 38 of the valve 24. The brakes also include adjusters 43.

Pressure from the supply tank 10 passes through the valve 12 which controls the amount of pilot line pressure and fills the lines 44, 45, 46, 47 and 48 which comprise conduits for receiving air. The pressure in the lines 44 and 45 keeps the valve 14 open (shown closed). When one of valves 50 or 52, connected to one of the wheels 64, opens as during lock-up, the pressure in the pilot lines, including the pressure in lines 46, 47 and 48, drops and the valve 14 closes (as illustrated in the drawing). This prevents service pressure in line 22 from being applied to the brakes 40 from relay valve 24.

The features relating to the anti-lock system described in connection with FIG. 1 were involved in the aforementioned application. The same anti-lock features may also be related to the present invention wherein the valves 50 and 52 are connected to the wheels of a tractor involving solid axles for driving the wheels or other solid axle unpowered vehicles. Generally, the switching valves 50 and 52 are connected on the hubs of the wheels to rotate about their axii. In order for either of the valves 50 and 52 to control pilot pressure, they must be connected to the line 46 via lines 47 and 48. The means for accomplishing this, to be described in detail, is illustrated generally by brackets 51. The pressure in lines 44 and 45 controls the application of the service pressure to the brakes of the vehicle by causing slave valve 14 to close or open. The features relating to the anti-lock system which make them applicable to tractors or vehicles having solid drive axles, to which the present invention is related, will now be described.

Figure 3:
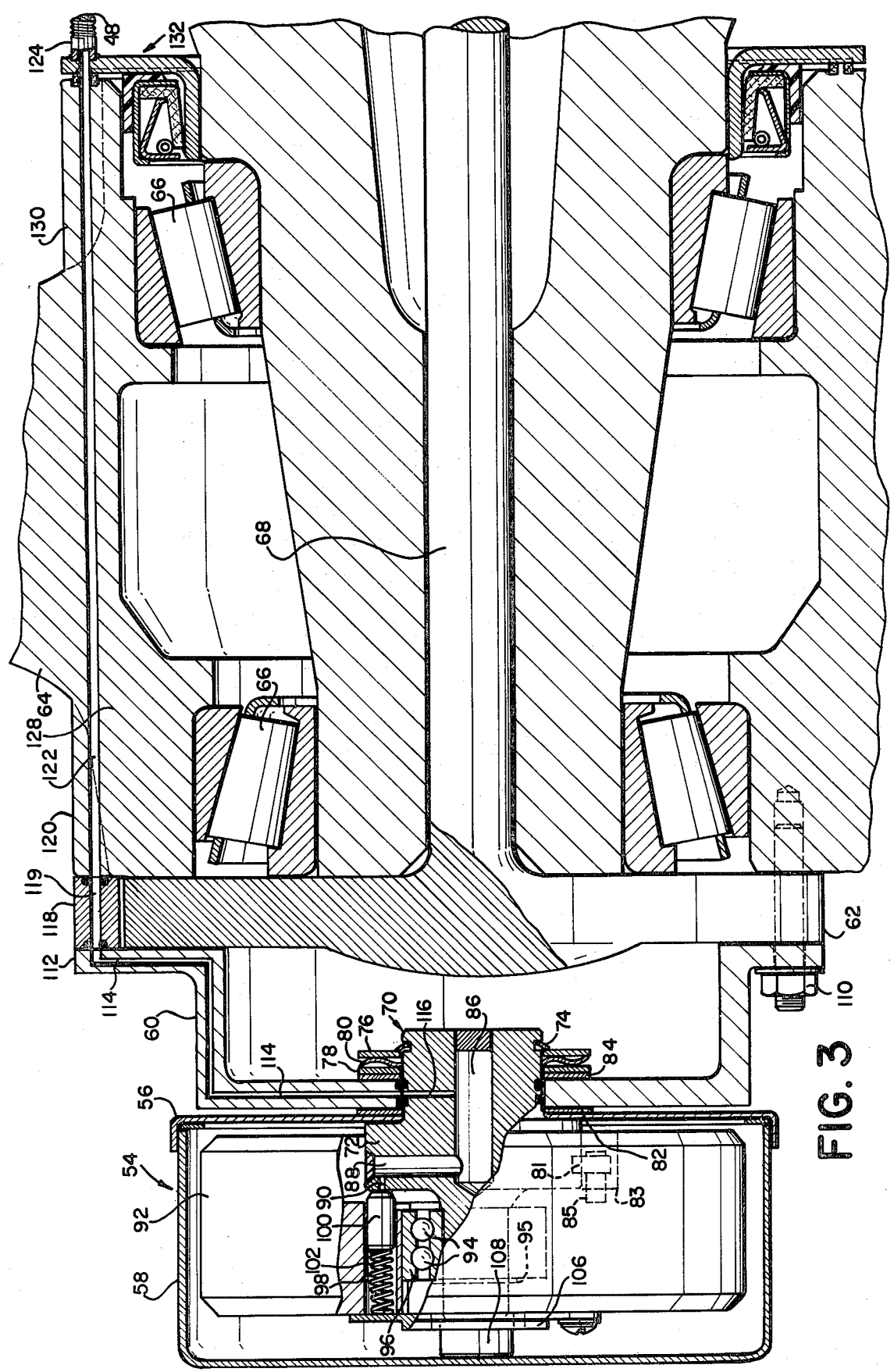
FIG. 3 is a view partly in cross-section and partly broken away of an anti-lock device and system, in accordance with the present invention.

Referring to FIG. 3, a switching device 54 of the type which may be connected to lines 47 and 48 by means to be described includes a housing 54 having a lid 56 and a cover 58 mounted to drive member 60, which is secured to a cap 62 on the wheel 64 and drive axle 68. The switching device 54 is mounted to rotate with the drive member 60 and cap 62 of the wheel 64 of the vehicle. The wheel 64 is mounted on suitable bearings 66 to rotate about the axle 68. Parts of the switching device 54 extend through the drive member 60 and then connected through or across the wheel 64 of the vehicle to either of the pressure lines 47 or 48 to provide the anti-lock means, as described in connection with FIG. 1.

Extending from inside of the cover 58 to the interior of the drive member 60 is a manifold 70 which carries the elements of a switching valve. The manifold 70 extends through a central opening in the drive member 60 and lid 56 and is held in place on one side by a boss 72 which abuts the inside of the lid 56. A retainer ring 74 in a groove of the manifold hold components 76 and 78 disposed inside the drive member 60 at one end of the manifold 70. A compressible component 80 is disposed between the components 76 and 78 to form part of an energy absorption arrangement. Spacer rings 82 and 84 are provided on both sides of the drive member 60.

During normal operation, pilot pressure from the lines 46, 47 and 48 (FIG. 1) is applied into a chamber 86 by means to be described. The boss 72 includes a radially extending opening 88 with a perpendicular port 90 extending from the chamber 88. The port 90 is normally held closed by valve means, with the valve means opening to release the pilot pressure under a locking condition of the wheel 64.

An inertia wheel or flywheel 92 is disposed on bearing 94 and 96, held in place by bearing retainer 106, on the outwardly extending portion of the manifold 70. The inertia wheel 92 is driven at the same speed as the vehicle wheel except under locking conditions.

The inertia wheel 92 includes an opening 98 extending therethrough to receive a valve element 100 and biased spring 102 therein. Plate 106 retains and biases the spring 102. The spring 102 forces the valve element 100 such that it blocks the aperture 90 which leads to the port 90, which leads to the chambers 86 through the opening 88 in the manifold 70.

The inertia wheel 92 is normally spring biased in a direction to maintain the valve element 100 in a closed position with respect to the apertures 88 and 90. This may be accomplished by means of a spring connected between a first pin on the inertia wheel 92 and a second pin on the manifold 70. A stop member 81 affixed to the manifold 70 and located within a cavity 83 in the inertia wheel 92 drives the inertia wheel 92 in the same direction and speed as the movement of the manifold 70 and wheel 64. The valve 100 normally keeps port 90 closed as a result of tension in the spring pulling the inertia wheel stop member 85 against the manifold stop member 81. The details of this type of valving device describing the switching device 54 are disclosed in the aforementioned pending patent application. For an understanding of the present invention, it is sufficient to understand that the inertia wheel is held under tension to keep the valve closed under normal operation and opens during a lock-up conditions.

As described in the aforementioned application, during normal operation, the manifold 70 is connected to move with the cap 62 of the wheel 64 of the vehicle. If the wheel 64 and cap 62 of the vehicle suddenly stops rotating or slows down at an excessive predetermined rate, the manifold 70 stops or slows down. However, when the deceleration rate is relatively high, the inertia wheel 92 will tend to continue rotating causing the inertia wheel 92 to overcome the bias provided by a spring and to rotate with respect to the manifold 70. This causes the valve 100 to open port 90 and release pilot pressure from the pilot line and prevent braking pressure from being applied.

As the wheel 64 again comes back up to vehicle speed, the manifold 70 accelerates faster than the inertia wheel 92, to a position wherein both are moving together with stop member 81 in contact with stop member 85. The spring, which had been extended during deceleration, relaxes to close the valve 100 and port 90 thereby permitting braking to be resumed.

The manifold 70 is not rigidly mounted to the drive member 60 so that it can be rotated. The arrangement comprises a rotatable fitting to allow assembly 54, including the manifold 70 with the inertia wheel 92, to revolve in the presence of excessive deceleration to provide a form of energy absorption which is also described in the aforementioned application.

A manual control for checking the operation of the anti-lock valve system is also illustrated and described in the aforementioned application. This involves manually actuating the cover 58. The cover 58 is manually gripped and rotated. A spacer connecter member 108 is secured to the cover 58 and is connected to the manifold. Rotation of the cover 58 causes rotation of the manifold 70.

Figure 2:
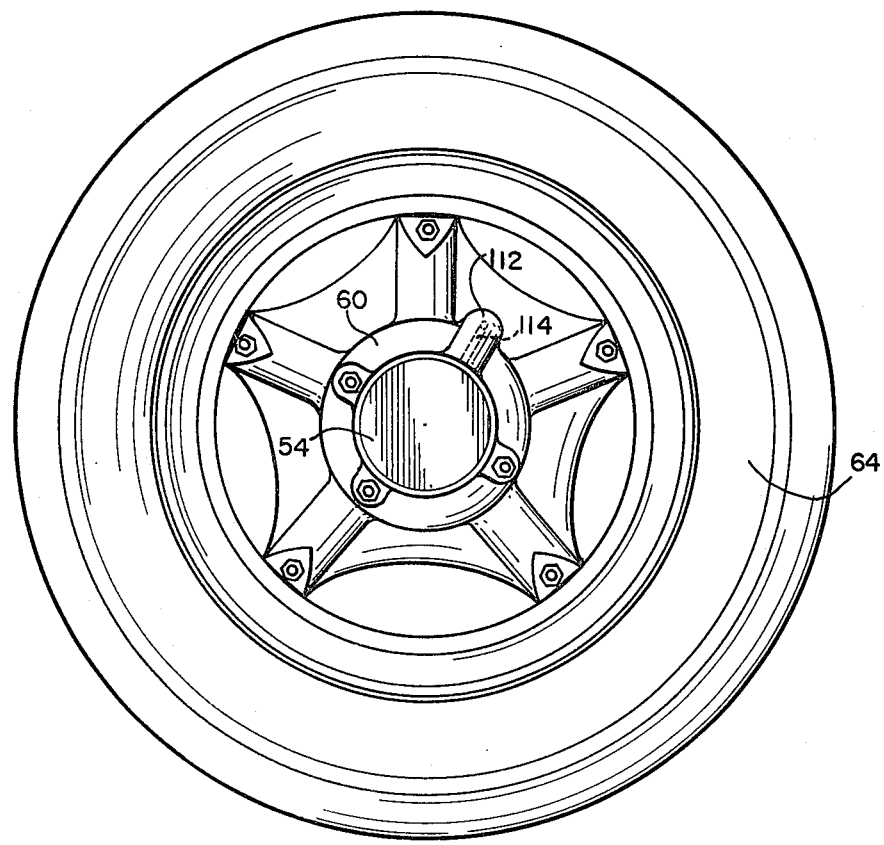
FIG. 2 is a side view of a vehicle wheel modified to provide an anti-lock device, in accordance with the present invention.
Figure 4:
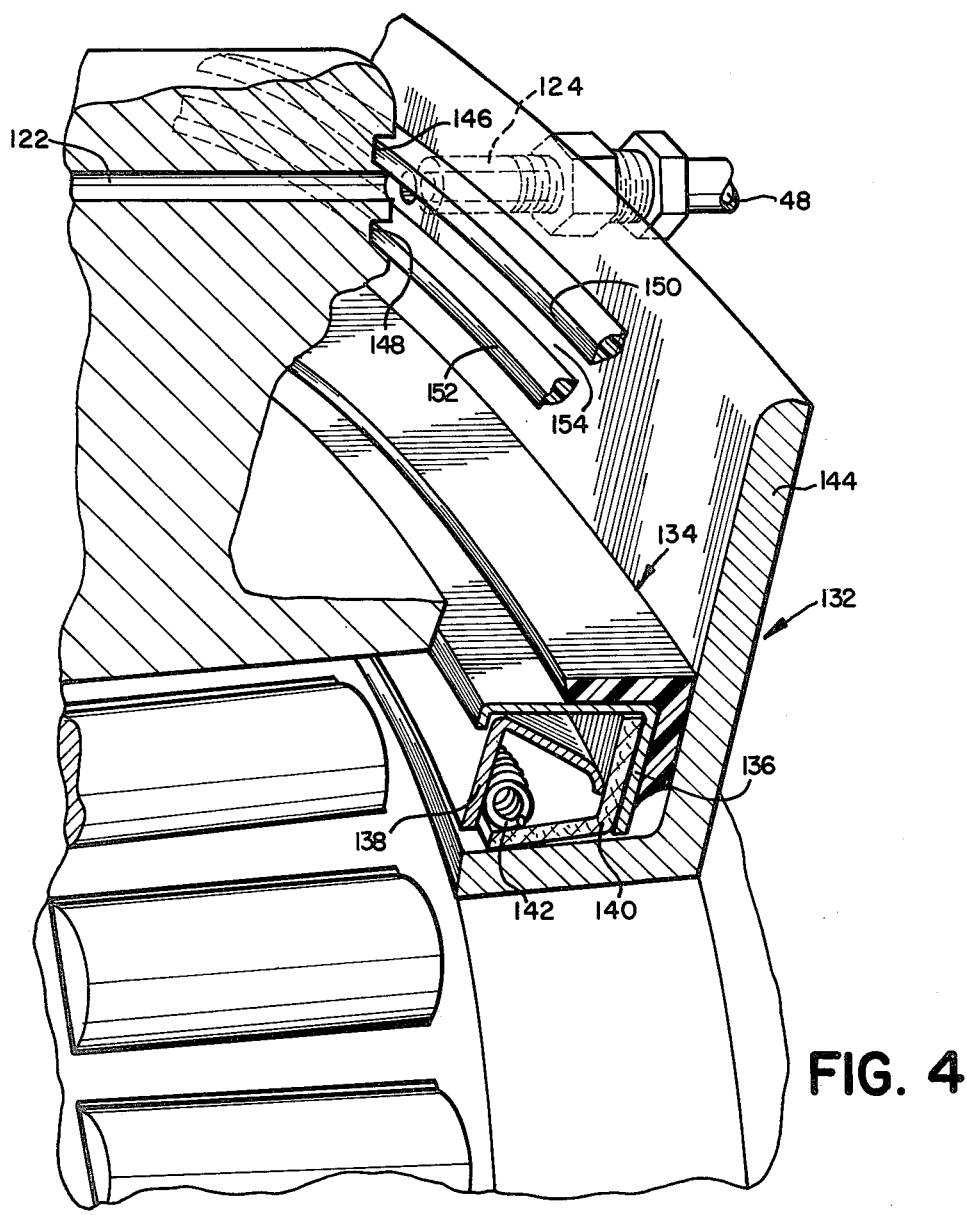
FIG. 4 is an enlarged isometric view of a portion of FIG. 3, partly in cross-section, illustrating the present invention.

As illustrated in FIG. 2, along with FIGS. 3 and 4, a modified spokewheel or hub 64 includes the switching device 54 mounted to the drive member 60. The driver member 60 is mounted to the cap 62 (FIG. 3) by means of bolts 110. An extending portion 112 may be integral with the drive member 60.

The drive member 60 includes an opening or passageway 114 which is aligned with an opening 116 leading to the chamber 86 of the manifold 70. The passageway 114 extends through the extending portion 112 of the drive member 60. A coupling unit 118 includes a centrally disposed opening 119 aligned with the opening 114 and a passageway 122. The passageway 122 extends from outboard the wheel 64 to inboard the wheel to a connector 124 leading to pilot line 48 (or 47). The passageway 122 extends through an extension 120, which may be added by suitable means to a conventional wheel, through or across the hub 128 and into structure 130 of the wheel to connecting means 124 leading to the pilot line 48 (FIG. 1). The inner structure 130 may comprise solid material added to a conventional wheel indicated by dotted lines. The elements represented generally by brackets 51 in FIG. 1 are made up of components 60, 112, 118, 120, 64, 130 and 124 of FIG. 3. The air passageway 51 represented by brackets 51 in FIG. 1 which extends from outboard to inboard of the wheel is illustrated in FIG. 3 and includes chamber 86 openings 88 and 90, passageways 114, 116, 119 and 122.

During operation, the switching device 54, drive member 60 and cap 62 are all rotated with the wheel with pilot pressue being applied from lines 46 and 48, through stationary means 132 to chamber 86 of the manifold 70. FIG. 4 illustrates details of the stationary means 132 which couples the pilot stationary source of pressure from the connector 124 to the rotating anti-lock pilot pressure source provided by the switching unit 54, via air passageway 51 (FIG. 1).

Referring to FIG. 4, circular member 132, somewhat similar to a grit deflector ring found in many conventional hub oil seals, is fixed in place, with the hub seal 134 being rotatable with the wheel 64. The elements of the hub seal 134 includes rigid rings 136, 138 and a non-rigid sealing lip 140. A spring 142 maintains the lip 140 in right sealing relationship to circular member 132. All of the features of the hub seal 134 are conventional and may be varied. However, the member 132 is different than conventional similar type members and includes an extending portion 144 extending beyond the other elements of the hub seal set. This portion provides part of the means for connecting the rotating elements including the switching unit 54 located outboard on the wheel 64 to the stationary elements, including the source of pilot pressure located inboard of the wheel 64.

The inboard section 130 of the wheel 64 includes concentric grooves 146 and 148 for receiving therein flexible non-rigid sealing rings 150 and 152, respectively. The section 130 normally forms part of the wheel but in some cases could be added to the wheel if required to provide a passageway if necessary, as indicated by the dashed lines. The sealing rings 150 and 152 are suitably mounted by adhesive or other suitable means within the grooves 146 and 148 to make continuous sliding contact with the portion 144 during rotation of the wheel. A circular chamber or annulus 154 is provided between the rings 150 and 152. During rotation of the wheel 64 and its inboard section 130, a continuous seal is maintained to permit pressure to pass from line 48 to passageway 122, while the seals 150 and 152 contact the stationary member 144. The annulus 154 is aligned to connect from the pilot line 48 to the passageway 122 at all times while the wheel is rotating with respect to the circular fixed member 132. During normal operation and during the lock up of the brakes, the pilot pressure from the line 48 is applied to the switching device 54 through the chamber 154 and passageway 122. When the switching device including valve 100 opens, as during lock up, the pilot pressure is relieved through openings 88 and 90 (FIG. 3) to thereby prevent service pressure from beng applied as described in connection with FIG. 1.

The means for connecting the pressure in line 48 to the passageway 122 may take forms other than that illustrated. For example, in some cases the sealing rings may be secured to the member 144 and ride in the grooves 146 and 148. Tight sealing by the rings 150 and 152 may in some cases eliminate the need for the grooves.

Figure 5:
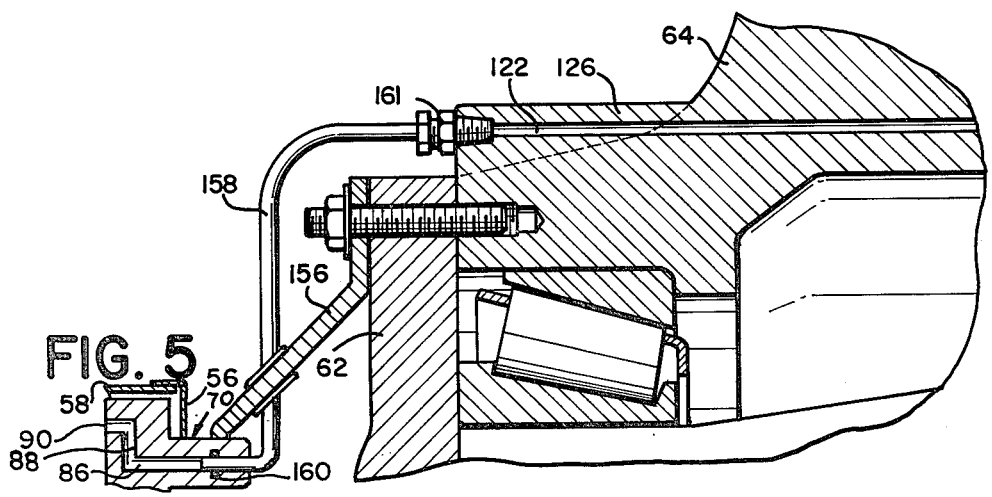
FIG. 5 is an enlarged broken away view illustrating another embodiment of the present invention.

FIG. 5 illustrates a different embodiment than the one illustrated in FIG. 3. Only parts relating to the present invention are illustrated. Like reference numerals are used in FIGS. 3 and 5 where the elements are substantially the same. The wheel 64 with extension 126 and cap 62 are the same as in FIG. 3. Instead of a drive member of the type illustrated as drive member 60 being used, a different type of drive member 156 is used, which is different in shape for the purpose of properly fitting 62, which may vary in size and profile. The drive member 156 does not include a passageway, such as the passageway 114 and the passageway 116 in the manifold is not needed. The manifold 70 forming part of the switching device 54 (not illustrated) is mounted by welding or other suitable means within a central opening of the drive member 156. The anti-lock switching operations are the same for FIGS. 3 and 5, with features relating to checking and energy absorption not being illustrated in FIG. 5.

Instead of a passageway 114 (FIG. 3) leading from the opening 116 in the manifold 70 to the passageway 122, a conduit 158 is employed; the conduit 158 is secured in an air seal 160 engaged with the manifold to receive the flow of air therethrough from the opening 122. The coupling unit 118 of FIG. 3 is not needed. The conduit 158 is held to the extension 126 by screw means to transmit air pressure from the conduit 158 between the passsageway 122 and chamber 86. The operation of the anti-lock system with the embodiment of FIG. 5 is the same as that previously described in connection with FIG. 3.

The embodiments illustrated have involved conventional wheel or hubs modified with extensions to provide connecting passageways. In some cases, it may be desirable to form a passageway in the wheel without modification. This could be done during or after the manufacture of the wheel.

What is claimed is:

1. In combination with a source of service pressure for actuating a brake for decelerating a vehicle wheel and means for selectively applying service pressure to the brake,
   (a) sensing means attached for rotation about the axis of rotation of said wheel outboard of said wheel;
   (b) a source of control pressure located inboard of said wheel and offset with respect to the axis of rotation thereof to control the application of said service pressure to said brake;
   (c) means including a passageway therein connecting said sensing means to said source of control pressure through a path removed from the axis of rotation of said wheel; said passage means including a passageway extending through the hub of said wheel, a fixed circular member secured to said vehicle, sealing means between said wheel and circular member, a sealed chamber formed between said rotatable wheel and fixed portion of said vehicle by said sealing means, said wheel and said circular member, and said source of control pressure being connected to said sealed chamber through said circular member;
   (d) said sensing means being responsive during normal rotation of said wheel to maintain said control pressure to permit service pressure to be applied to said brake, and
   (e) said sensing means being responsive when said wheel is decelerated beyond said predetermined rate to relieve said control pressure to prevent service pressure from being applied to said brake.

2. The combination as set forth in claim 1 wherein said sensing means comprises a normally closed switching device mounted at the center of said wheel to maintain the control pressure at said source during normal deceleration and disposed to open to relieve said control pressure during excessive deceleration of said wheel.

3. The combination as set forth in claim 2 wherein said sealing means includes a pair of concentric sealing rings forming said sealed chamber therebetween to connect the pressure between said switching device and said source of control pressure.

4. The combination as set forth in claim 3 wherein said switching device includes an inertia wheel for controlling the opening and closing of a valve in said switching device leading to said source of control pressure through said passageway.

5. The combination as set forth in claim 4 wherein a drive member is connected to the hub of said wheel to receive said switching device, said drive member including an opening therein leading from said switching device to the passageway in the hub of said wheel.

6. The combination as set forth in claim 4 wherein a drive member is connected to the hub of said wheel to receive said switching device, and a conduit extends through said drive member to connect said switching device to said passageway.

7. The combination as set forth in claim 5 wherein a projecting portion extends from said hub to provide said passageway.

8. The combination as set forth in claim 7 wherein said sealing rings are disposed within concentric grooves in said hub to rotate therewith and to sealingly engage a stationary member having a connector leading to said source of control pressure.

* * * * *